US012650567B2

(12) United States Patent
Liu et al.

(10) Patent No.: US 12,650,567 B2
(45) Date of Patent: Jun. 9, 2026

(54) ELECTRONIC PACKAGE AND MANUFACTURING METHOD THEREOF

(71) Applicant: SILICONWARE PRECISION INDUSTRIES CO., LTD., Taichung City (TW)

(72) Inventors: Shuai-Lin Liu, Taichung City (TW); Nai-Hao Kao, Taichung City (TW); Yu-Po Wang, Taichung City (TW)

(73) Assignee: SILICONWARE PRECISION INDUSTRIES CO., LTD., Taichung City (TW)

( * ) Notice: Subject to any disclaimer, the term of this patent is extended or adjusted under 35 U.S.C. 154(b) by 324 days.

(21) Appl. No.: 18/430,962

(22) Filed: Feb. 2, 2024

(65) Prior Publication Data

US 2025/0102750 A1 Mar. 27, 2025

(30) Foreign Application Priority Data

Sep. 25, 2023 (TW) .................................. 112136628

(51) Int. Cl.
*G02B 6/43* (2006.01)
*G02B 6/12* (2006.01)

(52) U.S. Cl.
CPC ........... *G02B 6/43* (2013.01); *G02B 6/12002* (2013.01); *G02B 6/12004* (2013.01)

(58) Field of Classification Search
CPC ... G02B 6/43; G02B 6/12002; G02B 6/12004
USPC .............................. 385/14, 31, 49; 438/27, 65
See application file for complete search history.

(56) References Cited

U.S. PATENT DOCUMENTS

| | | | | |
|---|---|---|---|---|
| 8,692,276 B2 * | 4/2014 | Doany | ................. | G02B 6/4246 |
| | | | | 257/85 |
| 9,906,312 B2 * | 2/2018 | Kim | ...................... | H04B 10/803 |
| 10,698,156 B2 * | 6/2020 | Coolbaugh | .............. | G02B 6/12 |
| 11,740,420 B2 * | 8/2023 | Bernabe | ............... | G02B 6/4212 |
| | | | | 385/14 |
| 2007/0086695 A1 * | 4/2007 | Hsu | ......................... | H01L 23/48 |
| | | | | 385/14 |
| 2007/0104413 A1 * | 5/2007 | Hsu | .......................... | G02B 6/42 |
| | | | | 385/14 |
| 2014/0294342 A1 * | 10/2014 | Offrein | ............... | G02B 6/4214 |
| | | | | 385/14 |

(Continued)

*Primary Examiner* — Robert Tavlykaev
(74) *Attorney, Agent, or Firm* — Studebaker Brackett PLLC

(57) ABSTRACT

An electronic package and a manufacturing method thereof are provided, in which a first optoelectronic element having a first optical fiber connection portion is disposed on an electronic module, a second optoelectronic element having a second optical fiber connection portion is disposed on a first level layer of a lower carrying portion of a step-shaped carrier structure, and the electronic module is disposed on a second level layer of the step-shaped carrier structure and the second optoelectronic element having the second optical fiber connection portion, so that the electronic module is electrically connected to the second optoelectronic element having the second optical fiber connection portion. Thereby, two optoelectronic elements having optical fiber connection portions can be easily and vertically integrated, and the second optoelectronic element can be stably carried by the step-shaped carrier structure.

20 Claims, 5 Drawing Sheets

(56)         References Cited

U.S. PATENT DOCUMENTS

2024/0411096 A1 * 12/2024 Lin ......................... G02B 6/43

* cited by examiner

ELECTRONIC PACKAGE AND MANUFACTURING METHOD THEREOF

BACKGROUND

1. Technical Field

The present disclosure relates to an electronic packaging technology, and more particularly, to an electronic package integrating a plurality of optoelectronic elements and a manufacturing method thereof.

2. Description of Related Art

Due to the demand for increasing the switch bandwidth of the optical engine (OE) module (for example, the bandwidth is planned to be expanded eight folds from 12.8 T to 102.4 T in 2028), the data transmission volume or data rate of optical modules per unit time is necessary to be enhanced in the limited space of machines such as switches or routers. For instance, the data transmission volume or data rate of the optical engine modules per unit time is enhanced from 400 G to 1.6 T or more.

FIG. 1 is a schematic cross-sectional view of a conventional semiconductor package 1 having an optoelectronic element 16. As shown in FIG. 1, an optical engine module 1a is provided on a packaging substrate 18. The optical engine module 1a comprises an encapsulating layer 15, an electrical integrated circuit (EIC) chip 11 and a plurality of conductive pillars 13 embedded in the encapsulating layer 15, a circuit structure 10 disposed on an upper side of the encapsulating layer 15, a wiring structure 14 disposed on a lower side of the encapsulating layer 15, and a single optoelectronic element 16 (such as a photonic IC or PIC) disposed on the circuit structure 10, so that the optical engine module 1a is disposed on the packaging substrate 18 through the wiring structure 14 by a plurality of solder balls 17, in which the optoelectronic element 16 of the optical engine module 1a can be externally connected to an optical fiber (not shown).

However, the optical engine module 1a of the conventional semiconductor package 1 can merely provide a single optoelectronic element 16 (and cannot provide a plurality of optoelectronic elements), so it is difficult to enhance the data transmission volume or data rate of the optical engine module 1a per unit time. Therefore, the operation performance or data transmission performance of the semiconductor package 1 cannot be improved.

Therefore, there is a need for a solution that addresses the aforementioned shortcomings in the prior art.

SUMMARY

In view of the aforementioned shortcomings of the prior art, the present disclosure provides an electronic package, which comprises: an electronic module; a first optoelectronic element having a first optical fiber connection portion and disposed on and electrically connected to the electronic module; a step-shaped carrier structure having a carrying portion; and a second optoelectronic element having a second optical fiber connection portion and disposed on a first level layer of the carrying portion of the step-shaped carrier structure, wherein the first level layer of the carrying portion of the step-shaped carrier structure is lower than a second level layer of the step-shaped carrier structure; wherein the electronic module is disposed on the second level layer of the step-shaped carrier structure and the second optoelectronic element having the second optical fiber connection portion, and the electronic module is electrically connected to the second optoelectronic element having the second optical fiber connection portion.

The present disclosure also provides a method of manufacturing an electronic package, the method comprises: disposing a first optoelectronic element having a first optical fiber connection portion on an electronic module, and electrically connecting the first optoelectronic element to the electronic module; disposing a second optoelectronic element having a second optical fiber connection portion on a first level layer of a carrying portion of a step-shaped carrier structure, wherein the first level layer of the carrying portion of the step-shaped carrier structure is lower than a second level layer of the step-shaped carrier structure; and disposing the electronic module on the second level layer of the step-shaped carrier structure and the second optoelectronic element having the second optical fiber connection portion, wherein the electronic module is electrically connected to the second optoelectronic element having the second optical fiber connection portion.

In the aforementioned electronic package and method, the electronic module has a first connection region and a second connection region, wherein the first connection region of the electronic module is electrically connected to the first optoelectronic element, the second connection region of the electronic module is electrically connected to the second optoelectronic element, and the first optoelectronic element and the second optoelectronic element transmit signals to each other via the electronic module.

In the aforementioned electronic package and method, the electronic module has at least one first electronic element, and the first electronic element is bonded with and electrically connected to a plurality of conductors.

In the aforementioned electronic package and method, the electronic module has a plurality of conductive bumps, a circuit structure, a plurality of conductive pillars, a wiring structure and a plurality of conductive elements, wherein the first optoelectronic element having the first optical fiber connection portion is electrically connected to the second optoelectronic element having the second optical fiber connection portion via the plurality of conductive bumps, the circuit structure, the plurality of conductive pillars, the wiring structure and the plurality of conductive elements sequentially.

In the aforementioned electronic package and method, the second level layer of the step-shaped carrier structure is flush or coplanar with an upper surface of the second optoelectronic element having the second optical fiber connection portion.

In the aforementioned electronic package and method, a length or an area of the first level layer of the carrying portion of the step-shaped carrier structure is ⅔ or more of a length or an area of the second optoelectronic element carried by the step-shaped carrier structure.

In the aforementioned electronic package and method, the first optical fiber connection portion of the first optoelectronic element and the second optical fiber connection portion of the second optoelectronic element are located at the same side, and the first optical fiber connection portion faces the second optical fiber connection portion.

In the aforementioned electronic package and method, the first optical fiber connection portion of the first optoelectronic element and the second optical fiber connection portion of the second optoelectronic element are located at opposite sides.

In the aforementioned electronic package and method, the electronic package may comprise at least one second electronic element disposed on the first optoelectronic element having the first optical fiber connection portion and electrically connected to the first optoelectronic element.

In the aforementioned electronic package and method, the electronic package may comprise at least one third electronic element disposed on the second optoelectronic element having the second optical fiber connection portion and electrically connected to the second optoelectronic element.

As can be understood from the above, in the electronic package and the manufacturing method thereof, the first optoelectronic element having the first optical fiber connection portion is disposed on the electronic module, and the second optoelectronic element having the second optical fiber connection portion is disposed on the carrying portion of the step-shaped carrier structure, so that two optoelectronic elements having optical fiber connection portions can be easily and vertically integrated in the electronic package, such that the data transmission volume or data rate of the electronic package per unit time can be enhanced or multiplied, and the operating performance or data transmission performance of the electronic package can also be enhanced.

Also, in the present disclosure, the second optoelectronic element having the second optical fiber connection portion can be disposed on the first level layer of the lower carrying portion in the step-shaped carrier structure, so that three-dimensional (3D) structure of the electronic package can be utilized to vertically integrate the two optoelectronic elements having the optical fiber connection portions, such that the overall height or volume of the electronic package can be effectively maintained or not increased.

Furthermore, the carrying portion of the step-shaped carrier structure of the present disclosure can stably carry the second optoelectronic element, so that the second optoelectronic element will not be suspended and can avoid the risk of being tilted. The present disclosure can also meet the requirement of high precision in fiber attaching so as to facilitate the precise connection of the second optical fiber connection portion of the second optoelectronic element and the optical fiber (such as the bus of the optical fiber cable), so that joint failure between the second optical fiber connection portion of the second optoelectronic element and the optical fiber is less likely to occur.

DETAILED DESCRIPTION

Figure 1:
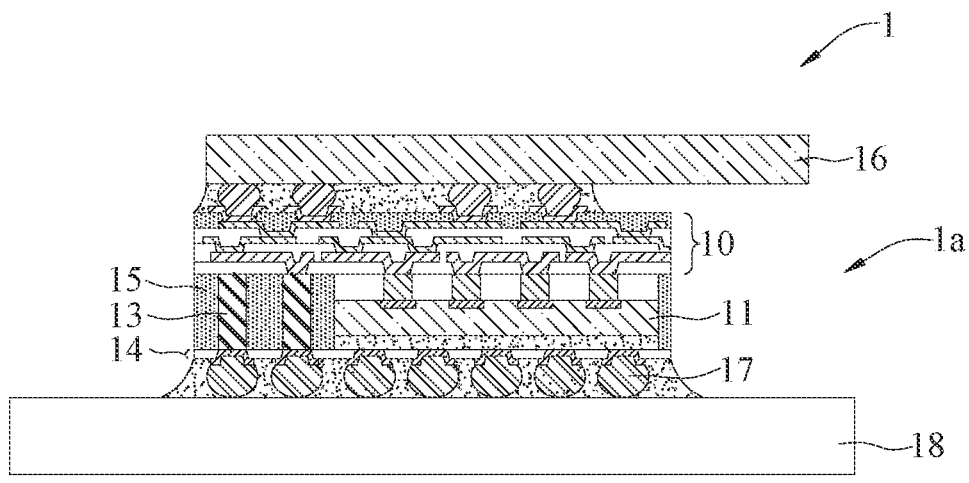
FIG. 1 is a schematic cross-sectional view of a conventional semiconductor package having an optoelectronic element.

Implementations of the present disclosure are described below by embodiments. Other advantages and technical effects of the present disclosure can be readily understood by one of ordinary skill in the art upon reading the disclosure of this specification.

It should be noted that the structures, ratios, sizes shown in the drawings appended to this specification are provided in conjunction with the disclosure of this specification in order to facilitate understanding by those skilled in the art. They are not meant, in any ways, to limit the implementations of the present disclosure, and therefore have no substantial technical meaning. Without influencing the effects created and objectives achieved by the present disclosure, any modifications, changes or adjustments to the structures, ratios, or sizes are construed as falling within the scope covered by the technical contents disclosed herein. Meanwhile, terms such as "on," "above," "upper," "below," "lower," "first," "second," "third," "a," "one," "two," and the like, are for illustrative purposes, and are not meant to limit the scope implementable by the present disclosure. Any changes or adjustments made to the relative relationships, without substantially modifying the technical contents, are also to be construed as within the scope implementable by the present disclosure.

FIG. 2A to FIG. 2D are schematic cross-sectional views illustrating a manufacturing method of an electronic package 2 of the present disclosure.

Figure 2A:
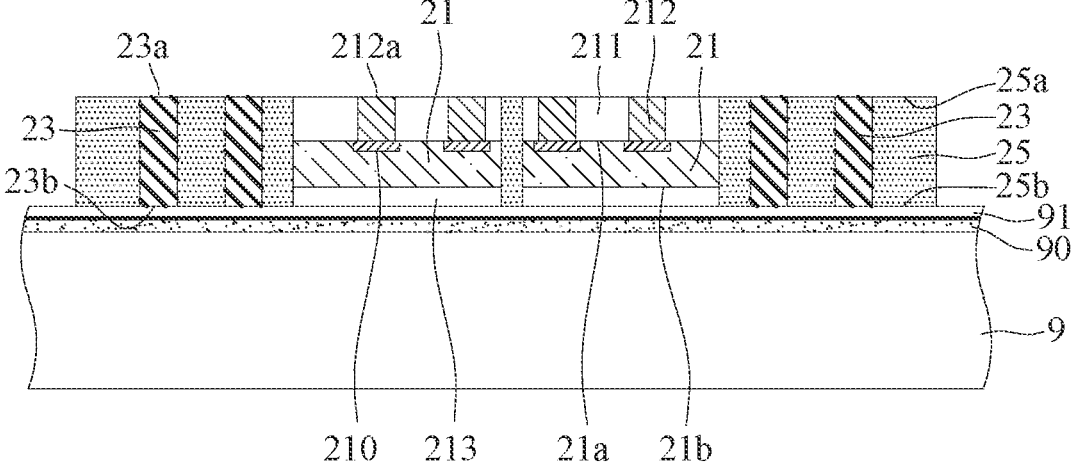
FIG. 2A to FIG. 2D are schematic cross-sectional views illustrating a manufacturing method of an electronic package of the present disclosure.

As shown in FIG. 2A, firstly, a plurality of conductive pillars 23 are formed on a carrier board 9, at least one or a plurality of first electronic elements 21 are disposed on the carrier board 9 (this example shows two first electronic elements 21), and a plurality of conductors 212 are bonded on and electrically connected to the first electronic elements 21. Meanwhile, "at least one" mentioned in the present disclosure represents one or more (such as one, two, or three), and "plurality" represents two or more (such as two, three, four, ten, or more than ten).

In one embodiment, the carrier board 9 can be a board made of semiconductor material (such as silicon or glass), and a release layer 90 and an insulating layer 91 made of such as dielectric material or solder-resist material are sequentially formed on the carrier board 9 by for example coating so as to allow the plurality of conductive pillars 23 to be disposed on the insulating layer 91.

In one embodiment, the first electronic element 21 is an active element, a passive element, or a combination of the active element and the passive element, wherein the active element may be a semiconductor chip, and the passive element may be a resistor, a capacitor, or an inductor.

In one embodiment, the first electronic element 21 is a semiconductor chip, such as a drivers or a trans impedance amplifier (TIA), and the first electronic element 21 may have an active surface 21a and an inactive surface 21b opposing the active surface 21a. The inactive surface 21b of the first electronic element 21 is bonded or adhesively fixed onto the insulating layer 91 by a bonding layer 213, and the active surface 21a of the first electronic element 21 has a plurality of electrode pads 210 and is covered with a protective film 211 made of such as passivation material, and the plurality of conductors 212 are disposed in the protective film 211.

In one embodiment, a material forming the conductive pillar 23 is a metal material such as copper or a solder material, and the conductor 212 is a conductive line, a spherical conductive member such as a solder ball, or a columnar metal conductive member such as a copper pillar, a solder bump, or a stud conductive member made by a wire-bonding machine, but the present disclosure is not limited to as such.

Then, an encapsulating layer 25 is formed on the insulating layer 91 of the carrier board 9, so that the encapsulating layer 25 covers at least one (e.g., a plurality of) first electronic element 21 and the plurality of conductive pillars 23, wherein the encapsulating layer 25 has a first surface 25a and a second surface 25b opposing the first surface 25a, so that the encapsulating layer 25 is bonded onto the insulating layer 91 of the carrier board 9 via the second surface 25b thereof, and the protective film 211, end surfaces 212a of the plurality of conductors 212 and end surfaces 23a of the plurality of conductive pillars 23 are exposed from the first surface 25a of the encapsulating layer 25.

In one embodiment, the encapsulating layer 25 is made of insulating material, such as polyimide (PI), dry film, molding colloid or molding compound such as epoxy resin. For example, the encapsulating layer 25 may be formed on the insulating layer 91 by liquid compound, injection, lamination, or compression molding.

Furthermore, the first surface 25a of the encapsulating layer 25, the protective film 211, the end surfaces 23a of the conductive pillars 23 and the end surfaces 212a of the conductors 212 are flush or coplanar with each other by the leveling process, so that the end surfaces 23a of the conductive pillars 23 and the end surfaces 212a of the conductors 212 are exposed from the first surface 25a of the encapsulating layer 25. For example, the leveling process removes part of the material of the protective film 211, part of the material of the conductive pillars 23, part of the material of the conductors 212 and part of the material of the encapsulating layer 25 by grinding.

Also, other end surfaces 23b of the plurality of conductive pillars 23 and the second surface 25b of the encapsulating layer 25 may also be flush or coplanar with each other.

Figure 2B:
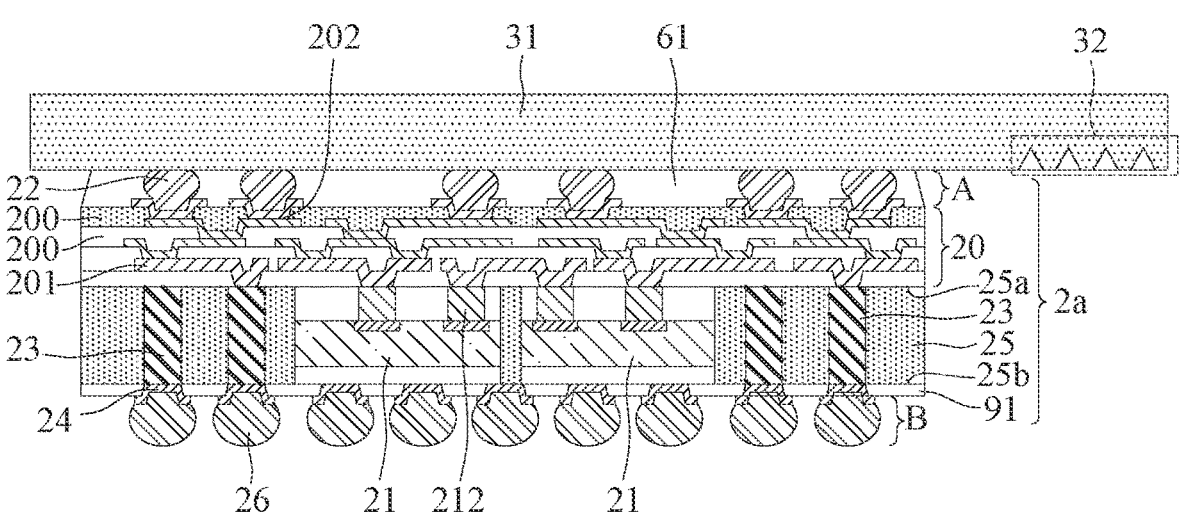

As shown in FIG. 2B, a circuit structure 20 is formed on the first surface 25a of the encapsulating layer 25, and the circuit structure 20 is electrically connected to the plurality of conductive pillars 23 and the plurality of conductors 212.

In one embodiment, the circuit structure 20 comprises a plurality of insulation layers 200 and a plurality of redistribution layers (RDLs) 201 formed on the plurality of insulation layers 200, and an outermost insulation layer 200 can be served as a solder-resist layer, and parts of the outermost redistribution layer 201 are exposed from the solder-resist layer to be served as electrical contact pads 202. Alternatively, the circuit structure 20 may also merely comprise a single insulation layer 200 and a single redistribution layer 201.

In one embodiment, the material for forming the redistribution layer 201 is copper, and the material for forming the insulation layer 200 is dielectric material such as polybenzoxazole (PBO), polyimide (PI), prepreg (PP), or solder-resist material such as solder mask (e.g., green paint), graphite (e.g., ink), etc.

Next, a first optoelectronic element 31 (such as a photonic IC or PIC) having a first optical fiber connection portion 32 is disposed on and electrically connected to the circuit structure 20, and the first optical fiber connection portion 32 of the first optoelectronic element 31 can be connected to a bus (not shown) of an optical fiber or an optical fiber cable to transmit optical signals.

In one embodiment, the first optoelectronic element 31 is electrically connected to the electrical contact pads 202 of the circuit structure 20 via a plurality of conductive bumps 22 such as solder balls, copper pillars, or others in a flip-chip manner. Alternatively, the first optoelectronic element 31 can also be electrically connected to the circuit structure 20 via a plurality of wires (not shown) in a wire-bonding manner. There are many ways for the first optoelectronic element 31 to be electrically connected to the circuit structure 20, and the present disclosure is not limited to as such.

In addition, a first underfill 61 can be formed between the first optoelectronic element 31 and the circuit structure 20 to cover the plurality of conductive bumps 22.

Next, the carrier board 9 and the release layer 90 thereon shown in FIG. 2A are removed, and the insulating layer 91 is remained. Then, a wiring structure 24 to be electrically connected to the plurality of conductive pillars 23 is formed on the insulating layer 91, and a plurality of conductive elements 26 such as copper pillars or solder balls are bonded onto the wiring structure 24.

In one embodiment, a plurality of openings can be formed in the insulating layer 91 by laser, so that the plurality of openings of the insulating layer 91 expose the end surfaces 23b of the plurality of conductive pillars 23. Then, the wiring structure 24 is bonded to the end surfaces 23b of the plurality of conductive pillars 23 through the plurality of openings of the insulating layer 91, and the plurality of conductive elements 26 such as copper pillars or solder balls are bonded onto the wiring structure 24.

Further, by providing the carrier board 9 having the insulating layer 91, the insulating layer 91 can be used to form the wiring structure 24 after the carrier board 9 is removed. Therefore, there is no need to arrange a dielectric layer, so the process time and process steps can be saved to achieve the purpose of reducing process costs.

In one embodiment, an electronic module 2a can be constituted by the circuit structure 20, the first electronic elements 21, the conductors 212, the conductive bumps 22, the conductive pillars 23, the wiring structure 24, the encapsulating layer 25, the conductive elements 26 and/or the insulating layer 91, etc., and the electronic module 2a may be defined with a first connection region A and a second connection region B in a vertical direction.

Figure 2C:
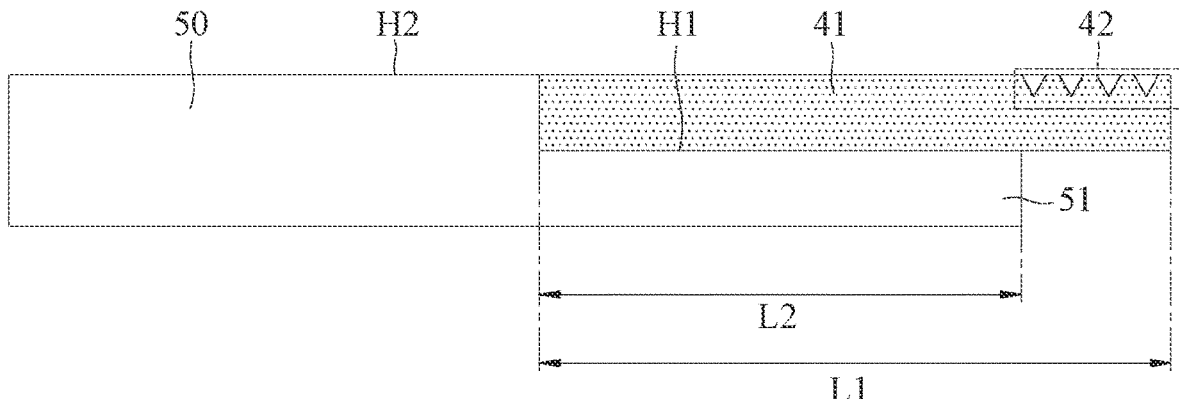

As shown in FIG. 2C, a second optoelectronic element 41 (such as a photonic IC or PIC) having a second optical fiber connection portion 42 is disposed on a first level layer H1 of a carrying portion 51 of a step-shaped carrier structure 50, and the first level layer H1 of the carrying portion 51 of the step-shaped carrier structure 50 is lower than a second level layer H2 of the step-shaped carrier structure 50, and the second optical fiber connection portion 42 of the second optoelectronic element 41 can be connected to an optical fiber or a bus of an optical fiber cable (not shown) to transmit optical signals.

In one embodiment, the step-shaped carrier structure 50 may be in the form of a substrate (such as a step-shaped substrate). For example, the step-shaped carrier structure 50 may be a packaging substrate with a core layer and a circuit structure or a coreless circuit structure, and the circuit structure comprises at least one insulation layer and at least one circuit layer bonded with the insulation layer, such as at least one fan-out type redistribution layer (RDL). It should be understood that the step-shaped carrier structure 50 can also be other types of board, such as a lead frame, a wafer, or other types of carrier board with metal routings, and the present disclosure is not limited to as such.

In one embodiment, the second level layer H2 of the step-shaped carrier structure 50 and the upper surface (such as the active surface) of the second optoelectronic element 41 can be flush or coplanar with each other. For example, a height of the second level layer H2 of the step-shaped carrier structure 50 is approximately equal to the sum of a height of the first level layer H1 of the step-shaped carrier structure 50 and a height of the second optoelectronic element 41. However, in other embodiments, the second level layer H2 of the step-shaped carrier structure 50 and the upper surface (such as the active surface) of the second optoelectronic element 41 may be non-flush or non-coplanar with each other, that is, the second level layer H2 of the step-shaped carrier structure 50 and the upper surface (such as the active surface) of the second optoelectronic element 41 may have slight height differences.

In one embodiment, a length L2 or an area (such as a carrying area) of the first level layer H1 of the carrying portion 51 of the step-shaped carrier structure 50 is ⅔ or more of a length L1 or an area of the second optoelectronic element 41, so that the first level layer H1 of the carrying portion 51 can stably carry or support the second optoelectronic element 41, but the present disclosure is not limited to as such.

Figure 2D:
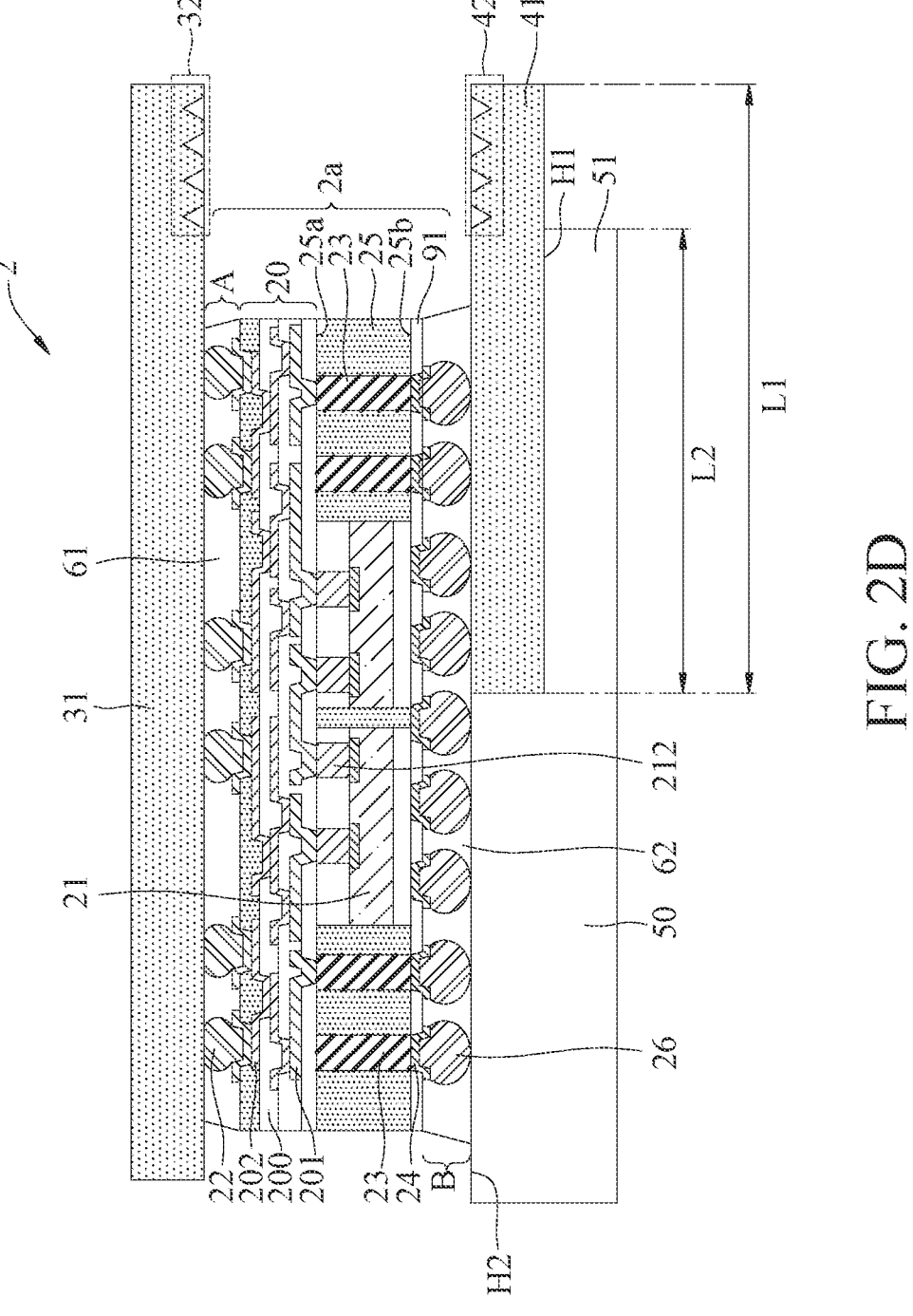

As shown in FIG. 2D, the electronic module 2a electrically connected to the first optoelectronic element 31 having the first optical fiber connection portion 32 in FIG. 2B is disposed on the second level layer H2 of the step-shaped carrier structure 50 and the second optoelectronic element 41 having the second optical fiber connection portion 42 in FIG. 2C, and the plurality of conductive elements 26 in the second connection region B of the electronic module 2a are electrically connected to the second level layer H2 of the step-shaped carrier structure 50 and the second optoelectronic element 41 having the second optical fiber connection portion 42 respectively to obtain the electronic package 2 of the present disclosure.

Furthermore, a second underfill 62 can be formed above both the second optoelectronic element 41 and the second level layer H2 of the step-shaped carrier structure 50 to below the insulating layer 91 of the electronic module 2a, so that the plurality of conductive elements 26 in the second connection region B of the electronic module 2a are covered by the second underfill 62.

In one embodiment, the first optical fiber connection portion 32 of the first optoelectronic element 31 and the second optical fiber connection portion 42 of the second optoelectronic element 41 can both be located at the same side (such as the right side) of the electronic package 2, and the first optical fiber connection portion 32 directly faces the second optical fiber connection portion 42.

In one embodiment, the plurality of conductive bumps 22 in the first connection region A of the electronic module 2a are bonded to the circuit structure 20, the plurality of conductive pillars 23 are electrically connected to the circuit structure 20 and the wiring structure 24 respectively, and the wiring structure 24 is bonded to the plurality of conductive elements 26 of the second connection region B. Also, the first optoelectronic element 31 can be electrically connected to the second optoelectronic element 41 in the sequence of the plurality of conductive bumps 22 of the first connection region A, the circuit structure 20, the plurality of conductive pillars 23, the wiring structure 24 and the plurality of conductive elements 26 of the second connection region B of the electronic module 2a.

In one embodiment, the first connection region A of the electronic module 2a can be electrically connected to the first optoelectronic element 31 having the first optical fiber connection portion 32, and the second connection region B of the electronic module 2a can be electrically connected to the second optoelectronic element 41 having the second optical fiber connection portion 42, and the first optoelectronic element 31 having the first optical fiber connection portion 32 and the second optoelectronic element 41 having the second optical fiber connection portion 42 can transmit signals to each other via the electronic module 2a. For example, the first optoelectronic element 31 and the second optoelectronic element 41 can transmit signals with each other via the plurality of conductive bumps 22 of the first connection region A, the circuit structure 20, the plurality of conductive pillars 23, the wiring structure 24 and the plurality of conductive elements 26 of the second connection region B of the electronic module 2a.

In addition, in other manufacturing method embodiments, the second optoelectronic element 41 having the second optical fiber connection portion 42 can be disposed on the step-shaped carrier structure 50 first, and then the electronic module 2a is disposed on the second optoelectronic element 41 and the step-shaped carrier structure 50, and then the first optoelectronic element 31 having the first optical fiber connection portion 32 is disposed on the electronic module 2a.

Figure 3:
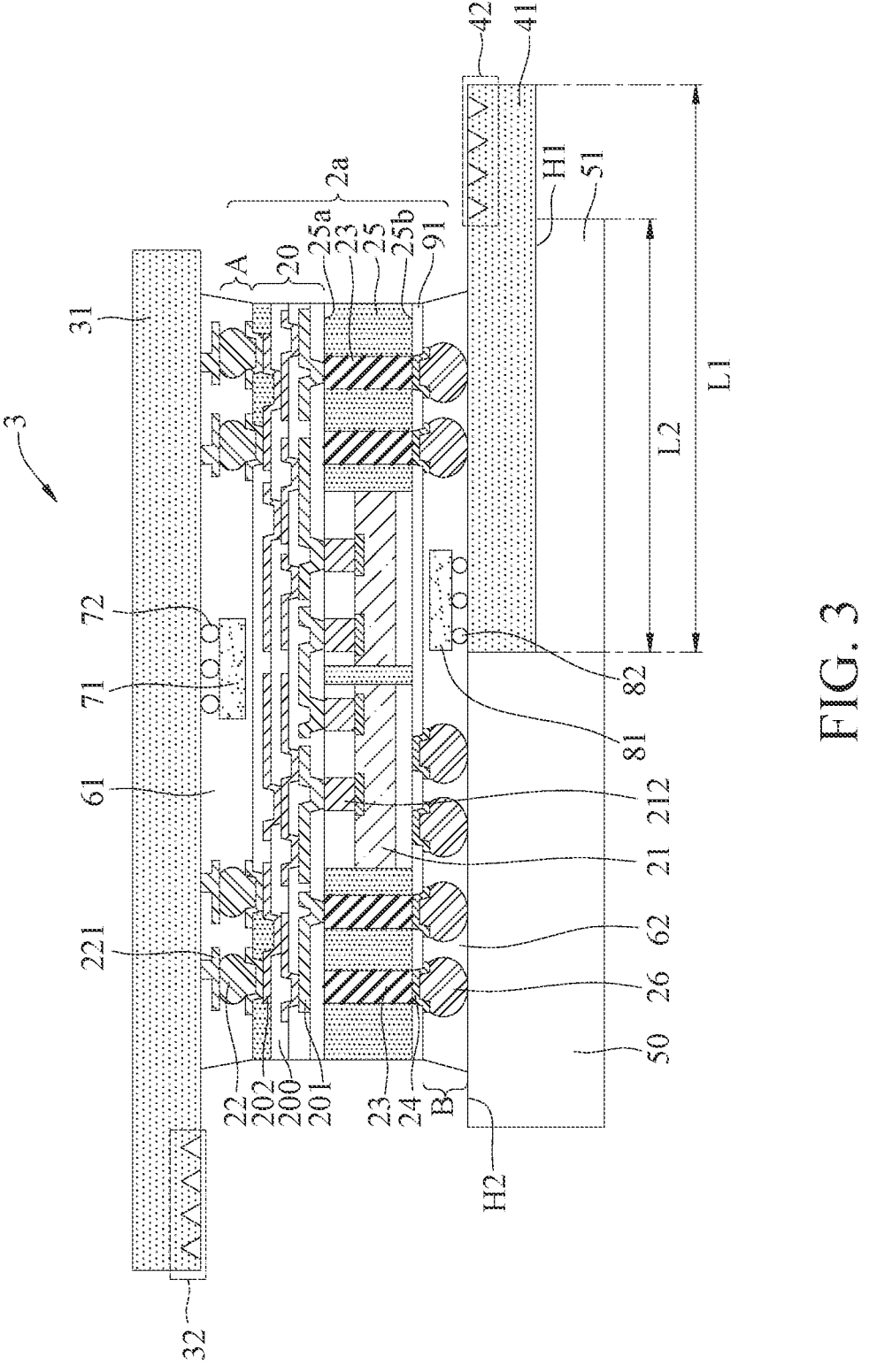
FIG. 3 is a schematic cross-sectional view of an electronic package according to another embodiment of the present disclosure.

FIG. 3 is a schematic cross-sectional view of an electronic package 3 according to another embodiment of the present disclosure. Also, the main technical differences between the electronic package 3 of FIG. 3 and the electronic package 2 of FIG. 2D are as follows, and the remaining technical contents are the same as the detailed descriptions of FIG. 2A to FIG. 2D which will not be repeated.

As shown in FIG. 3, the first optical fiber connection portion 32 of the first optoelectronic element 31 and the second optical fiber connection portion 42 of the second optoelectronic element 41 can be located at opposite sides of the electronic package 3. For example, the first optical fiber connection portion 32 and the second optical fiber connection portion 42 are located at the first side (such as the left side) and the second side (such as the right side) of the electronic package 3 respectively.

The electronic package 3 may further comprise a plurality of conductors 221, at least one (e.g., a plurality of) second electronic element 71 and/or at least one (e.g., a plurality of) third electronic element 81, wherein the plurality of conductors 221 are disposed between the plurality of conductive bumps 22 and the first optoelectronic element 31 and are electrically connected to the plurality of conductive bumps 22 and the first optoelectronic element 31, the second electronic element 71 is disposed on the first optoelectronic element 31 having the first optical fiber connection portion 32 and is electrically connected to the first optoelectronic element 31, and the third electronic element 81 is disposed on the second optoelectronic element 41 having the second optical fiber connection portion 42 and is electrically connected to the second optoelectronic element 41.

In one embodiment, the conductor 221 is a conductive line, a spherical conductive member such as a solder ball, or a columnar metal conductive member such as a copper pillar, a solder bump, or a stud conductive member made by a wire-bonding machine. The second electronic element 71 or the third electronic element 81 is an active element, a passive element, or a combination of the active element and the passive element, wherein the active element is for example a semiconductor chip, and the passive element is for example a resistor, a capacitor, or an inductor.

In one embodiment, the second electronic element 71 is electrically connected to the first optoelectronic element 31 via a plurality of conductors 72 such as solder balls, copper pillars or others in a flip-chip manner, and the third electronic element 81 is electrically connected to the second optoelectronic element 41 via a plurality of conductors 82 such as solder balls, copper pillars or others in a flip-chip manner. For example, the active surface of the second electronic element 71 is connected to the active surface of the first optoelectronic element 31, and the active surface of the third electronic element 81 is connected to the active surface of the second optoelectronic element 41. There are many ways for the second electronic element 71 and the third electronic element 81 to electrically connect to the first optoelectronic element 31 and the second optoelectronic element 41 respectively, and the present disclosure is not limited to as such.

The present disclosure also provides an electronic package 2, 3, which comprises: an electronic module 2a; a first optoelectronic element 31 having a first optical fiber connection portion 32 and disposed on the electronic module 2a and electrically connected to the electronic module 2a; a step-shaped carrier structure 50 having a carrying portion 51; and a second optoelectronic element 41 having a second optical fiber connection portion 42 and disposed on a first level layer H1 of the carrying portion 51 of the step-shaped carrier structure 50, wherein the first level layer H1 of the carrying portion 51 of the step-shaped carrier structure 50 is lower than a second level layer H2 of the step-shaped carrier structure 50; wherein the electronic module 2a is disposed on the second level layer H2 of the step-shaped carrier structure 50 and the second optoelectronic element 41 having the second optical fiber connection portion 42, and the electronic module 2a is electrically connected to the second optoelectronic element 41 having the second optical fiber connection portion 42.

In one embodiment, the electronic module 2a may have a first connection region A and a second connection region B, wherein the first connection region A of the electronic module 2a is electrically connected to the first optoelectronic element 31 having the first optical fiber connection portion 32, and the second connection region B of the electronic module 2a is electrically connected to the second optoelectronic element 41 having the second optical fiber connection portion 42.

In one embodiment, the electronic module 2a may have at least one first electronic element 21 and a plurality of conductors 212, and the first electronic element 21 is bonded and electrically connected to the plurality of conductors 212.

In one embodiment, the electronic module 2a may have a plurality of conductive bumps 22, a circuit structure 20, a plurality of conductive pillars 23, a wiring structure 24 and a plurality of conductive elements 26, wherein the first optoelectronic element 31 having the first optical fiber connection portion 32 is electrically connected to the second optoelectronic element 41 having the second optical fiber connection portion 42 in a sequence of the plurality of conductive bumps 22, the circuit structure 20, the plurality of conductive pillars 23, the wiring structure 24 and the plurality of conductive elements 26.

In one embodiment, the second level layer H2 of the step-shaped carrier structure 50 and an upper surface of the second optoelectronic element 41 having the second optical fiber connection portion 42 are flush or coplanar with each other, but the present disclosure is not limited to as such.

In one embodiment, a length L2 or an area of the first level layer H1 of the carrying portion 51 of the step-shaped carrier structure 50 may be ⅔ or more of a length L1 or an area of the second optoelectronic element 41 carried by the step-shaped carrier structure 50, but the present disclosure is not limited to as such.

In one embodiment, the first optical fiber connection portion 32 of the first optoelectronic element 31 and the second optical fiber connection portion 42 of the second optoelectronic element 41 are located at the same side of the electronic package 2, and the first optical fiber connection portion 32 faces the second optical fiber connection portion 42.

In one embodiment, the first optical fiber connection portion 32 of the first optoelectronic element 31 and the second optical fiber connection portion 42 of the second optoelectronic element 41 are located at opposite sides of the electronic package 3.

In one embodiment, the electronic package 3 may comprise at least one second electronic element 71, wherein the second electronic element 71 is located on the first optoelectronic element 31 having the first optical fiber connection portion 32 and is electrically connected to the first optoelectronic element 31.

In one embodiment, the electronic package 3 may comprise at least one third electronic element 81, wherein the third electronic element 81 is located on the second optoelectronic element 41 having the second optical fiber connection portion 42 and is electrically connected to the second optoelectronic element 41.

In view of the above, the electronic package and the manufacturing method thereof according to the present disclosure have at least the following features, advantages, or technical effects.

I. In the present disclosure, the first optoelectronic element having the first optical fiber connection portion can be disposed on the electronic module, and the second optoelectronic element having the second optical fiber connection portion can be disposed on the carrying portion of the step-shaped carrier structure, so that two optoelectronic elements having optical fiber connection portions can be easily and vertically integrated in the electronic package, such that the data transmission volume or data rate of the electronic package per unit time can be enhanced or multiplied, and the operating performance or data transmission performance of the electronic package can also be enhanced.

II. In the present disclosure, the second optoelectronic element having the second optical fiber connection portion can be disposed on the first level layer of the lower carrying portion in the step-shaped carrier structure, so that three-dimensional (3D) structure of the electronic package can be utilized to vertically integrate the two optoelectronic elements having the optical fiber connection portions, such that the overall height or volume of the electronic package can be effectively maintained or not increased.

III. The carrying portion of the step-shaped carrier structure of the present disclosure can stably carry the second optoelectronic element, so that the second optoelectronic element will not be suspended and can avoid the risk of being tilted. The present disclosure can also meet the requirement of high precision in fiber attaching so as to facilitate the precise connection of the second optical fiber connection portion of the second optoelectronic element and the optical fiber (such as the bus of the optical fiber cable), so that joint failure between the second optical fiber connection portion of the second optoelectronic element and the optical fiber is less likely to occur.

IV. In the present disclosure, the first connection region and the second connection region of the electronic module can be electrically connected to the first optoelectronic element and the second optoelectronic element respectively, so that the first optoelectronic element and the second optoelectronic element can effectively transmit signals to each other via the electronic module.

V. In the present disclosure, the second level layer of the step-shaped carrier structure can be flush or coplanar with the upper surface of the second optoelectronic element having the second optical fiber connection portion, so that the two optoelectronic elements having the optical fiber connection portions can be vertically integrated in the electronic package, and the overall height or volume of the electronic package can also be effectively maintained or not increased.

VI. In the present disclosure, the length or area of the carrying portion (the first level layer) of the step-shaped carrier structure is ⅔ or more of the length or area of the second optoelectronic element carried by the step-shaped carrier structure, so that the carrying portion of the step-shaped carrier structure can stably carry the second optoelectronic element.

VII. In the present disclosure, the first optical fiber connection portion of the first optoelectronic element and the second optical fiber connection portion of the second optoelectronic element can be disposed at the same side or at the opposite sides, so that the first optical fiber connection portion and the second optical fiber connection portion can be easily connected to the fiber optic or the bus of the fiber optic cable at the same or opposite sides of the electronic package.

VIII. In the present disclosure, at least one (such as a plurality of) electronic element can be disposed on the first optoelectronic element having the first optical fiber connection portion or on the second optoelectronic element having the second optical fiber connection portion, so that more electronic elements can be easily and vertically integrated in the electronic package, and the overall performance of the electronic package can also be improved.

The above embodiments are provided for illustrating the principles of the present disclosure and its technical effect, and should not be construed as to limit the present disclosure in any way. The above embodiments can be modified by one of ordinary skill in the art without departing from the spirit and scope of the present disclosure. Therefore, the scope claimed of the present disclosure should be defined by the following claims.

What is claimed is:

1. An electronic package, comprising:
an electronic module;
a first optoelectronic element having a first optical fiber connection portion and disposed above and electrically connected to the electronic module;
a step-shaped carrier structure having a carrying portion; and
a second optoelectronic element having a second optical fiber connection portion and disposed on a first level layer of the carrying portion of the step-shaped carrier structure, wherein the first level layer of the carrying portion of the step-shaped carrier structure is lower than a second level layer of the step-shaped carrier structure;
wherein the electronic module is disposed on the second level layer of the step-shaped carrier structure and above the second optoelectronic element having the second optical fiber connection portion, and the electronic module is electrically connected to the second optoelectronic element having the second optical fiber connection portion.

2. The electronic package of claim 1, wherein the electronic module has a first connection region and a second connection region, wherein the first connection region of the electronic module is electrically connected to the first optoelectronic element, the second connection region of the electronic module is electrically connected to the second optoelectronic element, and the first optoelectronic element and the second optoelectronic element are configured to transmit signals to each other via the electronic module.

3. The electronic package of claim 1, wherein the electronic module has at least one first electronic element, and the first electronic element is bonded with and electrically connected to a plurality of conductors.

4. The electronic package of claim 1, wherein the electronic module has a circuit structure, a plurality of conductive pillars, a wiring structure and a plurality of conductive elements, wherein the first optoelectronic element having the first optical fiber connection portion is electrically connected to the second optoelectronic element having the second optical fiber connection portion via the circuit structure, the plurality of conductive pillars, the wiring structure and the plurality of conductive elements sequentially.

5. The electronic package of claim 1, wherein the second level layer of the step-shaped carrier structure is flush or coplanar with an upper surface of the second optoelectronic element having the second optical fiber connection portion.

6. The electronic package of claim 1, wherein a length or an area of the first level layer of the carrying portion of the step-shaped carrier structure is ⅔ or more of a length or an area of the second optoelectronic element carried by the step-shaped carrier structure.

7. The electronic package of claim 1, wherein the first optical fiber connection portion of the first optoelectronic element and the second optical fiber connection portion of the second optoelectronic element are located at the same side, and the first optical fiber connection portion faces the second optical fiber connection portion.

8. The electronic package of claim 1, wherein the first optical fiber connection portion of the first optoelectronic element and the second optical fiber connection portion of the second optoelectronic element are located at opposite sides.

9. The electronic package of claim 1, further comprising at least one second electronic element disposed on the first optoelectronic element having the first optical fiber connection portion and electrically connected to the first optoelectronic element.

10. The electronic package of claim 1, further comprising at least one third electronic element disposed on the second optoelectronic element having the second optical fiber connection portion and electrically connected to the second optoelectronic element.

11. A method of manufacturing an electronic package, the method comprising:
disposing a first optoelectronic element having a first optical fiber connection portion above an electronic module, and electrically connecting the first optoelectronic element to the electronic module;
disposing a second optoelectronic element having a second optical fiber connection portion on a first level layer of a carrying portion of a step-shaped carrier structure, wherein the first level layer of the carrying portion of the step-shaped carrier structure is lower than a second level layer of the step-shaped carrier structure; and
disposing the electronic module on the second level layer of the step-shaped carrier structure and above the second optoelectronic element having the second optical fiber connection portion, wherein the electronic module is electrically connected to the second optoelectronic element having the second optical fiber connection portion.

12. The method of claim 11, wherein the electronic module has a first connection region and a second connection region, wherein the first connection region of the electronic module is electrically connected to the first optoelectronic element having the first optical fiber connection portion, and the second connection region of the electronic module is electrically connected to the second optoelectronic element having the second optical fiber connection portion.

13. The method of claim 11, wherein the electronic module has at least one first electronic element, and the first electronic element is bonded with and electrically connected to a plurality of conductors.

14. The method of claim 11, wherein the electronic module has a circuit structure, a plurality of conductive pillars, a wiring structure and a plurality of conductive elements, wherein the first optoelectronic element having the first optical fiber connection portion is electrically connected to the second optoelectronic element having the second optical fiber connection portion via the circuit structure, the plurality of conductive pillars, the wiring structure and the plurality of conductive elements sequentially.

15. The method of claim 11, wherein the second level layer of the step-shaped carrier structure is flush or coplanar with an upper surface of the second optoelectronic element having the second optical fiber connection portion.

16. The method of claim 11, wherein a length or an area of the first level layer of the carrying portion of the step-shaped carrier structure is ⅔ or more of a length or an area of the second optoelectronic element carried by the step-shaped carrier structure.

17. The method of claim 11, wherein the first optical fiber connection portion of the first optoelectronic element and the second optical fiber connection portion of the second optoelectronic element are located at the same side, and the first optical fiber connection portion faces the second optical fiber connection portion.

18. The method of claim 11, wherein the first optical fiber connection portion of the first optoelectronic element and the second optical fiber connection portion of the second optoelectronic element are located at opposite sides.

19. The method of claim 11, further comprising disposing at least one second electronic element on the first optoelectronic element having the first optical fiber connection portion, and electrically connecting the second electronic element to the first optoelectronic element.

20. The method of claim 11, further comprising disposing at least one third electronic element on the second optoelectronic element having the second optical fiber connection portion, and electrically connecting the third electronic element to the second optoelectronic element.

* * * * *